(12) United States Patent
Olschewski

(10) Patent No.: US 7,649,682 B2
(45) Date of Patent: Jan. 19, 2010

(54) METHOD FOR SELF-MONITORING A MICROSCOPE SYSTEM, MICROSCOPE SYSTEM, AND SOFTWARE FOR SELF-MONITORING A MICROSCOPE SYSTEM

(75) Inventor: Frank Olschewski, Heidelberg (DE)

(73) Assignee: Leica Microsystems CMS GmbH, Wetzlar (DE)

(*) Notice: Subject to any disclaimer, the term of this patent is extended or adjusted under 35 U.S.C. 154(b) by 680 days.

(21) Appl. No.: 10/499,216

(22) PCT Filed: Dec. 9, 2002

(86) PCT No.: PCT/EP02/13914

§ 371 (c)(1),
(2), (4) Date: Jun. 15, 2004

(87) PCT Pub. No.: WO03/052694

PCT Pub. Date: Jun. 26, 2003

(65) Prior Publication Data

US 2005/0046930 A1  Mar. 3, 2005

(30) Foreign Application Priority Data

Dec. 15, 2001  (DE) ............................. 101 61 613

(51) Int. Cl.
*G02B 21/00* (2006.01)
(52) U.S. Cl. .................................. 359/368; 359/363

(58) Field of Classification Search ......... 359/368–390, 359/559
See application file for complete search history.

(56) References Cited

U.S. PATENT DOCUMENTS 5,751,475 A * 5/1998 Ishiwata et al. ............. 359/387

(Continued)

FOREIGN PATENT DOCUMENTS

DE  198 53 407  5/2000

(Continued)

OTHER PUBLICATIONS

Jianping Li, et al., "Measurement and Analysis of Defocused Point Spread Functions and Optical Transfer Functions of a Microscope", XP 000559579, 1995 IEEE, pp. 407-410.

(Continued)

*Primary Examiner*—Thong Nguyen
(74) *Attorney, Agent, or Firm*—Houston Eliseeva LLP

(57) ABSTRACT

This invention comprises a method, a software, and a microscope system for monitoring and controlling information loss. The observation of information that is not present and the comparison of ideal loss to actual loss generates an explanatory component by means of a rule set. The user is instructed by the microscope system in an appropriate manner, for example by means of a display, to undertake actions that remove the defects.

20 Claims, 4 Drawing Sheets

U.S. PATENT DOCUMENTS

| | | | |
|---|---|---|---|
| 5,959,726 A * | 9/1999 | Riley et al. | 356/124.5 |
| 6,166,380 A | 12/2000 | Kitagawa et al. | |
| 6,166,853 A * | 12/2000 | Sapia et al. | 359/559 |
| 6,664,528 B1 * | 12/2003 | Cartlidge et al. | 250/208.1 |
| 7,330,609 B2 * | 2/2008 | Wang et al. | 382/308 |
| 2003/0147133 A1 | 8/2003 | Engelhardt | |
| 2003/0184757 A1 * | 10/2003 | Bevilacqua et al. | 356/445 |

FOREIGN PATENT DOCUMENTS

| | | |
|---|---|---|
| DE | 100 57 948 | 7/2001 |
| JP | 11224640 A | 8/1999 |
| WO | 00/31576 A1 | 6/2000 |

OTHER PUBLICATIONS

Deepa Kundur, et al., "Blind Image Deconvolution: An Algorithmic Approach to Practical Image Restoration", IEEE Signal Processing Magazine, May 1996, pp. 1-42, Addendum pp. 1-4.

Bovik, A., ed., "Handbook of Image and Video Processing," San Diego: Academic Press, 2000, pp. 53-67.

* cited by examiner

METHOD FOR SELF-MONITORING A MICROSCOPE SYSTEM, MICROSCOPE SYSTEM, AND SOFTWARE FOR SELF-MONITORING A MICROSCOPE SYSTEM

CROSS-REFERENCE TO RELATED APPLICATIONS

This Application is the National Stage of International Application No. PCT/EP02/13914, filed Dec. 9, 2002, which claims the priority of German application DE 10161613.9, Dec. 15, 2001.

BACKGROUND OF THE INVENTION

The invention relates to a self-monitoring method for a microscope system.

Furthermore, the invention relates to a microscope system and software for a self-monitoring microscope system. Such microscope system comprises a scanning microscope that defines an illumination- and detection beam path; several means are envisaged for establishing an optical configuration, and the scanning microscope is connected to a controlling computer with a display.

Among many other papers, "Blind image deconvolution: An algorithmic approach to practical image restoration" (*IEEE Signal Processing Magazine*, May 1996) by Kundur and Hatzinakos described the underlying state of the art for analyzing and improving optical band-limiting systems without prior art. In publications such as Bovik's *Handbook of Image and Video Processing* (Academic Press, 2000), the state of the art for improving the image data of optical band-limiting systems using prior art is described extensively. Using such classes of algorithmic components—extensively described and discussed there—which are advantageously reduced to practice as software, it becomes possible to improve the image data delivered by a microscope system, and to monitor the operation of the microscope system itself.

BRIEF SUMMARY OF THE INVENTION

The principle of this invention is the appropriate coupling of technical means in order to create standard operating procedures for users that improve the user-system interface. Training time, in particular, will be minimized so that the value of the microscope system is increased. The state of the art mentioned in the above publications should for the most part be viewed as if it were contained in this description.

The fundamental aim of the invention is to create a method by which the user of a microscope may make an image of an object that is free of errors.

A further aim of the invention is to create a scanning microscope with which a user of the scanning microscope can quickly make an optimal image of an object that is free of errors.

An additional aim of the invention is to create a software with which a scanning microscope can be monitored with regard to quality during the final control stage of production, or with which images may be made quickly and optimally by a less skilled user.

It is advantageous that simple operation by the user (improved user-system interface), a reduction in error rates (certainty), and a reduction in training time (costs) are all achieved. In addition, the invention may be used to diagnose production errors during the mounting of the microscopes. If, for example, an optical component of the microscope in incorrectly mounted or adjusted, imaging errors will result. The invention makes it possible to quickly pinpoint the source of the error. The invention leads to successful microscopy and ensures better acceptance by users. The user can only fully use the complete array of individual functions described in the state of the art when all individual components are included in a total system, which must necessarily be the product of an intelligent integration of software and hardware components. Most of the method may be reduced to practice using either a controlling computer or electronics, FPGAs, or DSPs. The method, the system, and the software may be used with scanning microscopes (confocal, multiphoton), CCD fluorescence microscopes, and 4-pi microscopes.

It is particularly advantageous if the method comprises the following steps:

relaying the selected optical configuration to a controlling computer;

taking an image of a sample with the scanning microscope;

calculating the Fourier transforms of the image;

determining the optical transfer function appropriate to the selected optical configuration;

comparing the resolution limits of the Fourier transforms of the image with the resolution limits of the optical transfer function appropriate to the selected optical configuration; and analyzing and displaying of the comparative results.

Comparison of the resolution limits of the Fourier transforms of the image with the resolution limits of the optical transfer function appropriate to the selected optical configuration yields a set of characteristics that may be used for further analysis. Analysis can consist of exhibiting the characteristics in a display. Similarly, analysis of the characteristics can be determined by inference from a database, and the results then displayed. Advantageously, the resolution limits are determined, in which case the minima in the Fourier transforms of the image and the optical transfer function are maximized by means of a mathematical transformation, and the other values are suppressed. The optical transfer function may then be read from a database.

BRIEF DESCRIPTION OF THE SEVERAL VIEWS OF THE DRAWINGS

The subject matter of the invention is schematically shown in the diagram and described thereafter using figures. These show.

DETAILED DESCRIPTION OF THE INVENTION

Figure 1:
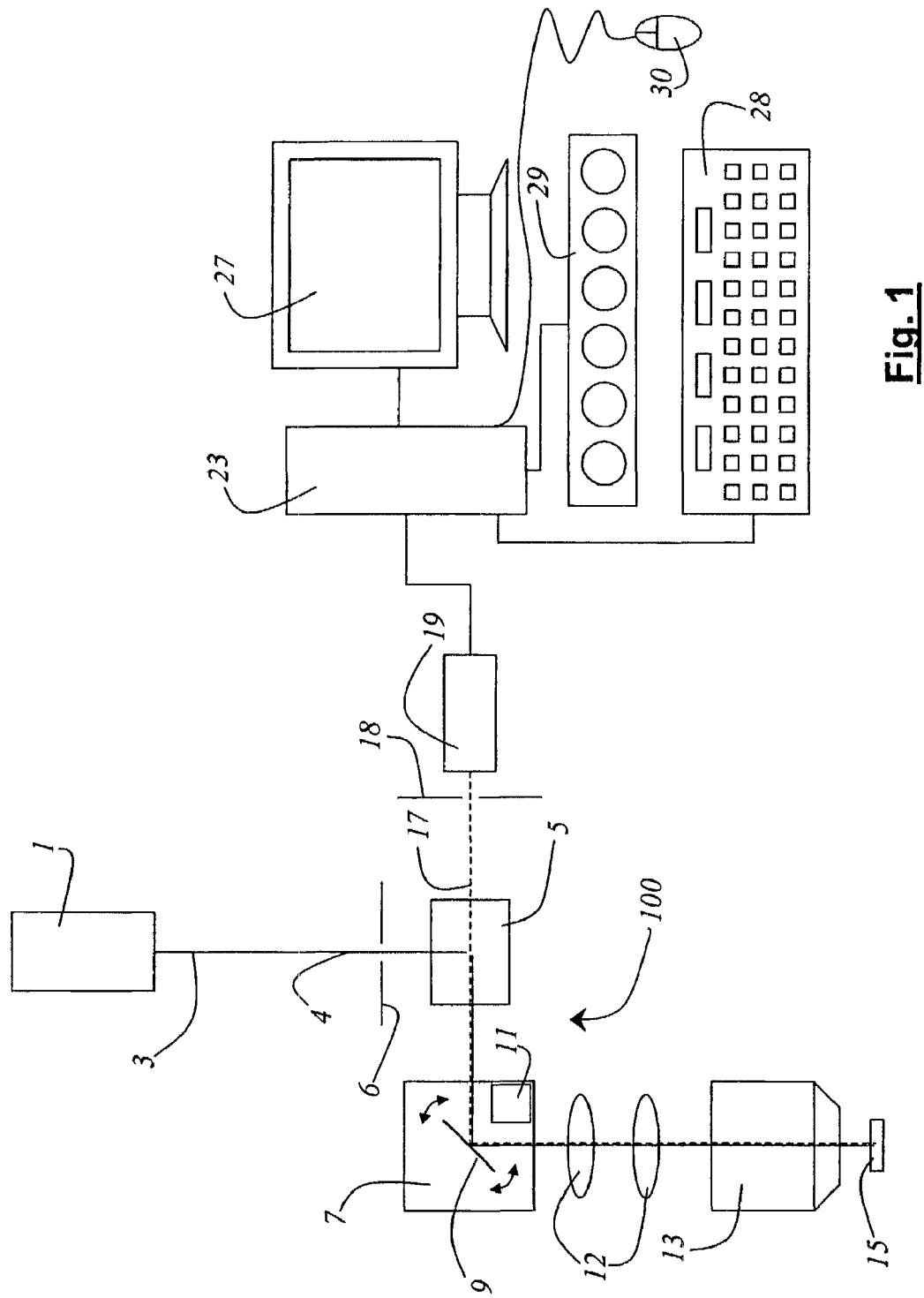
FIG. 1 a schematic representation of a microscope system according to the invention.

The embodiment of a confocal scanning microscope (100) is schematically represented in FIG. 1. However, this should not be viewed as a limitation of the invention. It should be more than sufficiently clear to the specialist that the invention can also be reduced to practice with a conventional microscope or a conventional scanning microscope. The light beam (3) coming from at least one illumination system (1) defines an illumination light beam (4) that is reflected by a beam splitter or other suitable reflecting material (5) to a scanning module (7). Before the illumination light beam (4) hits the reflecting material (5), it passes through an pinhole (6). The scanning module (7) comprises a cardanically suspended scanning mirror (9), which sends the illumination light beam (4) through a scanner lens (12) and a microscope lens (13) over or through an object (15). When it encounters non-transparent objects (15), the illumination light beam (4) is sent over the surface of the object. With biological objects (15) such as samples, or transparent objects, the illumination light beam (4) can also be sent through the object (15). To this end, nonluminous samples can be prepared with a suitable dye (not shown because it is established state of the art). This means that different focal planes of the object can be successively scanned by the illumination light beam (4). Subsequent combination yields a 3-dimensional image of the object. The light beam (3) coming from the illumination system (1) and the illumination light beam (4) are depicted as a solid line. The light coming from the object (15) defines a detection light beam (17). This beam reaches the beam splitter (5) through the microscope lens (13) or the scanner lens (12) via the scanning module (7), passes through the beam splitter and via a detection pinhole (18) reaches at least one detector (19), which is here embodied as a photo multiplier. The specialist will understand that other detection components, such as diodes, diode arrays, CCD chips, or CMOS image sensors can also be used. The detection beam (17) that comes from and is defined by the object (15) is depicted in FIG. 1 as a broken line. Electrical detection signals, which are proportional to the light coming from the object, are generated in the detector (19), and these are relayed to a controlling computer (23). The positional signals that are registered in the scanning module (7) with the help of an inductive or capacitive positional sensor (11) are also relayed to the controlling computer (23). The specialist will understand that the position of the scanning mirror (9) can also be determined by the variable signal. The controlling computer (23) is designed with a display (27) that gives the user the information needed to set the microscope system. Furthermore, the controlling computer (23) has a keyboard (28), an adjusting device (29) for the components of the microscope system, and a mouse (30).

The imaging characteristics of microscopes, including scanning microscopes, are determined by the physical characteristics of the optical imaging, the quality of the optical components built into the microscope, and the sample and its surroundings (embedding medium). These values are partly known, but also partly unknown. In general, the optical design of the imaging microscope and the associated or desired imaging characteristics that result are considered a priori knowledge. The effects that take place within the sample (e.g., refraction index or diffusion) and in the peripheral regions (optimal adjustment of the refraction index) are not considered a priori knowledge.

When configuring microscope systems, the user always operates with just such limited knowledge. The user may make systematic errors because of this lack of knowledge, or unexpected effects may occur in the sample itself. In general, the results can only be analyzed on the basis of the images yielded, making it necessary to draw on the knowledge of specialists. Usually, when image data are unsatisfactory, the configuration and imaging parameters must be set using a time-consuming "trial and error" process. The specialist then attempts to square the observation with the system model he has in mind by generating explanatory hypotheses from the observations and then testing these for plausibility against the knowledge he has gained by training and experience. As demonstrated below, this process may be automated by creating a database with data and rules that allow one to appropriately link the observed values, making them available to an inference engine that processes the data and rules systematically and iteratively until no further data can be derived from the initial data and the available rules. Explanations and tips for the user are to be seen as a subset of the derived data. By including statistical methods—by analyzing the data gained from the statistical set of image pixels—statements can be generated regarding significance. Such statistical heuristics allow for another level of certainty regarding the generated explanations so that the automated process is able to accomplish significantly more than can an expert, who often works unconsciously from gut feelings, without being able to elaborate an explicit explanatory model. Naturally, the performance of such a system is dependent upon the selected implementation and its quality, which leaves this message open to a degree of freedom and does not define it further.

Figure 2:
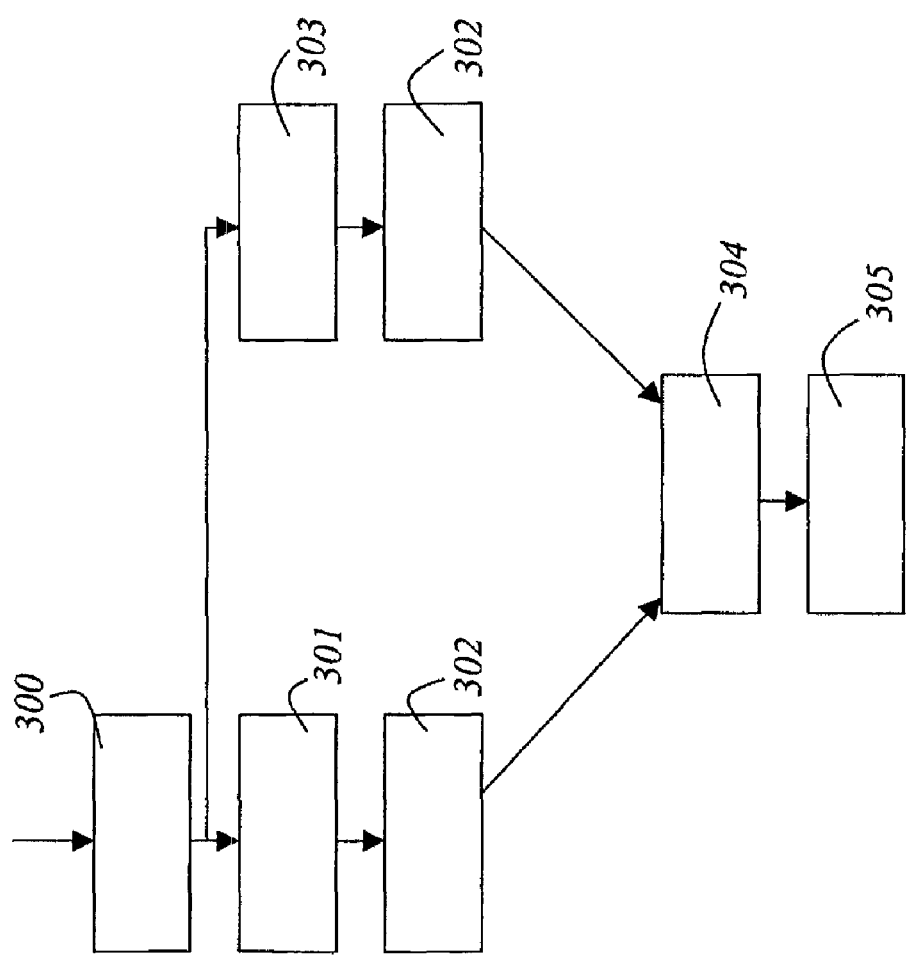
FIG. 2 a block diagram of the method according to the invention.

FIG. 2 shows a block diagram of the method according to the invention, by which a scanning microscope may be quickly and optimally adjusted. The quality of the image data and the total duration of the work process needed to produce a good image are the criteria by which both laypeople and experts should be judged. The method according to the invention supports the layperson and gives him numerous suggestions for how to optimize imaging or settings. One can draw conclusions indirectly regarding defects in imaging from the recorded image data (measurements) by comparing theoretical with actual measurements. The method according to the invention can best be described by means of block diagrams (FIG. 2). First, there is transmission (300, transmission/relay of optical configuration) of the selected optical configuration of the microscope to the controlling computer (23). This is necessary because the controlling computer (23) stores the configuration in a storage area set up specifically for that purpose so that it can be accessed at any time to do the necessary calculations. As the specialist knows well, such transmission in a microscope may serve to automate microscope configuration, and occurs, in particular, during the normal work process. In an especially elegant implementation of this invention, a set of configuration data is relayed only once to the various components, in which case all components that do not directly receive this signal are not depicted. The optical configuration can—this is by no means a complete list—include the following elements: the aperture number of the lens used, the lens enlargement used, the refraction index of the immersion medium, the intermediate microscope lens enlargement, the form of the aperture, the wavelength of the lighting, the wavelength of the detection beam, the number of scan spots per direction (x, y, z), etc. The concrete set of relevant optical imaging configuration parameters is, of course, dependent on the optical configuration implemented in the system and, given different forms, may vary. An example would be a comparison of a spectral-detecting confocal microscope with a filter-based confocal microscope, in which case the spectral detection path must be taken into consideration in one case and the optical filter characteristics in the other. Another example would be a comparison of a confocal microscope that scans points and a CCD-based wide field microscope in which the image formats (scan spots per degree of scan movement) can be freely selected in the first case, but are relatively fixed in CCD systems. It is obvious that the optical configurations can be relayed by the user to the controlling computer (23) by entering them, this signal also being understood to be a transmission (300). One could also imagine that an optical configuration changed during the work process could be automatically relayed to the controlling computer (23), this signal also being understood to be a transmission (300). The specialist will be quite familiar with the transmission (300) of parameters from various software components to a central component 5 set up for this purpose in the controlling computer in each reduction to practice. To simplify matters, the term controlling computer will also be used synonymously for these components in the sense that it comprises both software and hardware components. The controlling computer contains a storage area specifically for these configurations (not depicted because it can in any case be used as a necessary storage area in a computer) for the administration of appropriate optical configurations that will be used for subsequent calculations in the method according to the invention. In a next step, the "taking of an image" (301, taking of data/image/volume) takes place with the scanning microscope. A spectral model (302, spectral modeling/Fourier transformation with subsequent segmentation of the optical resolution limit) of the image is calculated from the recorded I(x) image data (intensity), advantageously directly from the Fourier transform of the image. In the following, the argument will be continued with the Fourier transforms, because this is the best-known spectral model for image processing. However, it should be noted that there are numerous other possibilities. An optical transfer function (303, OTF determination) appropriate to the optical configuration is then calculated from a database contained in the controlling computer, or from a simulation program in the controlling computer. It will be obvious to the specialist that the sequence of steps as depicted in the block circuit diagram by parallel paths is arbitrary. After determining the appropriate optical transfer function (OTF) for the selected optical configuration, one can draw inferences about the quality of the just-mounted microscope or inferences about the configuration settings of the microscope used to test the samples, by comparing the resolution limits of the Fourier transforms of the image and the resolution limits of the appropriate optical transfer function for the selected optical configuration. To this end, the OTF and the spectral model of the image are compared in a comparator (304, comparison). The output of the comparator (304), which, as shown below, yields complex vectorial results, are then analyzed (305, analysis). After analysis (305), the results of the comparison are displayed. The results can be displayed directly on the display monitor (27), in which case further interpretation is not needed.

The digital acquisition of signals, images, volumes is generally done according to a linear model that takes the form:

$$I(x) = o(x) \otimes h(x) + n(x) \quad \text{Equation 1}$$

where:
  I(x) is the measured image;
  x is the vector of the scan coordinates or the spatial coordinates for a certain image data in the recorded image segment;
  o(x) is the sample;
  ⊗ is the convolution operator;
  n(x) is all forms of noise (electronic or photonic noise; everything that is not in the model); and
  h(x) is the so-called Point Spread Function (PSF)

This model is dimensionless and may be applied to all three spatial directions and spectral components. The PSF corresponds to the imaging of a point (of an object that is smaller than the resolution of the microscope) that was, characteristically, blurred. During actual imaging, the well-validated linear theory for all points of an image from this spectral region is valid in the first approximation. The PSF is known to opticians in theory, and to the microscope manufacturer from the point of view of design, and may also be measured by the user. Measurement by the user is a time-consuming process and requires more than a little knowledge. In addition, the PSF may in part be greatly changed by environmental effects within the sample itself. In practice, such environmental effects may become so great (e.g., with very poor microscopy, incorrect embedding medium [water instead of oil], etc.) that the theory breaks down. The PSF degenerates and changes locally in volume. But if the settings are good, the theory is very good.

Convolution becomes simplified into simple multiplication after Fourier transformation. Imaging then takes the form:

$$I(f) = o(f)h(f) + n(f) \quad \text{Equation 2}$$

Here, the values named in Equation 2 are the Fourier transforms of the values in Equation 1, and f represents the lateral spatial frequency vector. Noise has been left out in Equation 3. The Fourier transforms of the h(x) point spread function is h(f) and is referred to in the optical literature as the Optical Transfer Function.

$$I(f) = o(f)h(f) \quad \text{Equation 3}$$

We can see in Equation 3 that zero positions of the PSF are in principle retained both in the frequency domain and in theory. This corresponds to a total data loss for structures of this spatial frequency. In addition, the Fourier transform still contains the zero positions of the image (the frequencies that were not present in the image). If the theoretical PSF h(x) is known, both the user and the microscope designer can expect to see only minor deviations from this ideal at optimum settings. This can be measured by the position of the zero positions of the optical transfer function.

A current practical limitation of detailed analyses may occur when the zero positions—which lie on constant curves in the frequency domain—have a form that is too complex. This limitation results from the available processing power of today's computers and the resulting computing time, but is not a generally limiting element and will be solved as processing power increases so that ever-more detailed analyses will be possible in ever-shorter times.

In practice, no zero positions are desired in such a process, but this cannot be achieved because of the presence of noise. Occasionally, there may be no zero positions in image signals degraded by high noise levels. However, in practice one works, for example, with the logarithmic power spectrum (see Equation 4):

$$\log(|I(f)|^2) = \log(|o(f)h(f) + n(f)|^2) \quad \text{Equation 4}$$

or similar functions, and looks for negative minima, which work better and more robustly in practice. In general, any mathematical transformation may be used that maximizes the minima in the Fourier transform of the image and the optical transfer function and suppresses the rest of the values. It should be noted that for this process, it is necessary to take an image with structure, because without structure, the Fourier transforms of the image consist exclusively of zero positions. In the inference engine described below, it is relatively easy to allow for data and rules, in which case the user will see a warning on the display (27).

However, there are still other alternatives to the above-described Fourier transformation. The reduction to practice of the spectral model can be done by direct calculation of a Fourier transformation using the Welch algorithm or by fitting auto regressive moving average models to the image data.

By the use of such preprocessing, patterns that are to be compared can be derived in the Fourier domain. Comparison of the position of the minima may be represented graphically as the difference between the resolution limits of the microscope system and the theory. In principle, what is expected is a displacement vector field that searches for a displacement vector for each pixel, which describes the deviation of the desired zero positions from the actual position. The deviations from the ideal may be read directly from this displacement vector field. Like movement detection this is a very demanding computational task, but it is sufficiently well solved by a fit. Given a model, such a displacement field can be calculated directly, in which case all elements of the displacement field may serve to characterize the deviation. Such displacement fields are also searched for in such fields as movement detection (optical flow), in which case the light intensity between two images is retained and the displacement between the two images is explained as movement, so that a velocity vector field can be searched for. Here it is important to retain the light intensity, so that static distortion can be searched for. A completely occupied vector field contains a huge amount of information, most of which unnecessary data; however, it is the maximum amount of information that can be extracted. A pragmatic approach that leads to satisfactory results is depicted in Equation 5.

$$h'=h(Mf) \quad \text{Equation 5}$$

This simple approach in Equation 5 allows for only linear deviational errors (rotation, distortion) between the theoretical PSF $h(f)$ and the actual PSF $h^1(f)$, and represents a greatly reduced subset of all displacement vector fields. In the spatial domain, the parameter corresponds to a maximum three-by-three matrix, which essentially yields nine characteristics to describe the distortion, which may be expressed as coefficients or as eigenvectors, depending on the mathematical tastes of the designer. One fits M in such a way that the zero positions of model $h^1(f)$ correspond to the (negative) minima of the measured and edited $\log(|I(f)|^2)$ and only a minimal residual error remains, in which case a suitable degree of error such as the quadratic sum of the deviation must be selected.

It should be mentioned that in principle all vector norms, but also weighted statistical degrees of deviation, can be used; however, a complete listing of possibilities would go well beyond the scope of this paper. It should furthermore be mentioned that in a computerized reduction to practice, fixed point or even integral arithmetic is preferable to the above depictions; however, such technical work-arounds are quite well known to specialists.

With three-dimensional imaging one can, by determining the deviation matrices of the individual sections of a volume, make statements about the 3-D imaging of the theoretical 2-D PSF, without actually determining a 3-D PSF directly. 3-D deformations of the PSF can be determined based on this reduction to PSF sections, just as they are generated by optical mismatches (oil/water). In this case, the above-described calculation is not done on the basis of a 3-D measurements, but rather on sequences of 2-D measurements, in which case the general procedure remains the same, and is sufficiently precisely expressed by this description. The important difference is that a larger number of characteristics can be determined sequentially.

Fitting the PSF to the actual minima in the image data can be done using the most varied search algorithms with computer techniques that are state-of-the-art, such as those described in Michaelewicz, Z, Fogel, D. B., *How to Solve It: Modern Heuristics* (Heidelberg: Springer, 2000) and Gershenfeld, *The Nature or of Mathematical Modeling* (Cambridge: Cambridge UP, 1998). However, both of these publications described only a small portion of the available state-of-the-art search and fit algorithms, all of which cannot be listed here.

The above-selected simple description of a matrix fit does not preclude the use of more complicated nonlinear mathematical warping models, which may become available as the technique develops, to match the theoretical and the actual PSF in order to generate more descriptive characteristics. This is not yet feasible given the current state of computers.

As described above, image data are required for the use of such algorithms. Because of this, parts of the following method are only usable if the microscope is sufficiently well preset (fine tuning), or can serve to determine that one is still far from the ideal.

As a result of the above-described fit to a deformation matrix M, for example, the deformation becomes quantifiable and may be used in diagnosis. Deviations from the optimum are subdivided into predetermined tolerance classes, for example, that serve to analyze the settings and to give the user feedback. Defects and configurational problems can be determined from measurements taken during the process. Examples of measurable deviations include spherical aberration and astigmatism, which may present as an spreading of the PSF, or spot distortion, which may present as a comet tail, etc. Such methods can be implemented as software with a database, a user interface, and an explanatory database. This may be drawn on for quality assurance (in in-house production, and externally with clients, e.g., in a multi-user environment), while a software assistant—the explanatory component—gives the user feedback that causes him to take certain actions, or that alerts him to the need for such, such as "not this way because . . . ," or "component defective," or "incorrect embedding medium."

The deviation can, for example, allow the system to decide in the case of a deconvolution process, whether a PSF must be taken, or whether one can continue to calculate using theoretical values. Such inverse filters are relatively unstable, mathematically complicated, and generally yield artifact. This artifact is not always obvious, even to specialists, because there is no possibility of taking comparative measurements. Nonetheless, these algorithms are attractive because they promise improvements in resolution. In practice, each form of deconvolution is (unfortunately) viewed by the user as a black box and is seldom tested. Because of this, such technology is often not used in applications in which certainty is an important criterion (medicine, research, etc.). A priori testing of the basic measured data to test whether their quality is sufficient for subsequent deconvolution is important. Doing so will enable the associated controlling computer to directly express that "poor measurement will lead to even poorer measurements as a result of deconvolution." Such technology will undoubtedly lead to greater acceptance of inverse filters in the market since the analysis of displacement fields is not a trivial matter.

The principle of inference over factual knowledge, in which a sequence takes the form

IF A THEN B

IF C THEN E

. . .

IF A AND C THEN D OR E, has long been standard in artificial intelligence. In these rules, the variables (here A, B, C, D, F) are logical statements that may be tested. All rules are arranged in a database and are processed using backtracking algorithms. The data are arranged in a list (e.g., A is true) and all rules are tested and new data generated from the rule set until no new data is generated in the course of a run. For example: the rule (IF XX THEN YY) is true to the extent that the XX premise is present, and this leads to a new datum. This old concept may be used directly if the appropriate set of characteristics has been correctly coded. In the case of the matrix example above, the matrix elements are characteristics in an unsuitable form. In a more suitable form, the same information is present as eigenvectors or eigenvalues of this matrix, and it will be sufficiently clear to specialists that this transformation of characteristics can be directly calculated in the first fitting, and therefore need not be described here. It will also be more than clear to the specialist that the original matrix components may be used to formulate the rules, examples of which will be given later since readability would suffer greatly from complete exposition. In theory, one may expect, for example, that the eigenvalues $E_1$, $E_2$, $E_3$ of the deviation matrix all equal 1 (one). The rule $$A=(E_1>E_2) \text{ AND } (E_1>E_3)$$

would, for example, be described as an egg-shaped distortion in a preferred direction, in which case statements may be gained regarding direction from similar rules for eigenvectors as well. Using a handful of rules, the data can b yield relatively simple interpretations such as "egg-shaped PSF distortion." The inference engine can then undertake to explain ever-more detailed analyses by iterative construction, in which case the type of analysis is explicitly undergirded by the control system, which in the case of sufficiently precise statements can be of great importance. By including the original optical configuration in the database, even higher-quality statements can be made. The performance of the system depends only on the number of rules, the quality of the rules, the initial data provided, and the precision with which these data are measured, and as a result there is a high level of freedom in implementation.

One possible inference chain after several iterations might be (for example):

IF ("distortion present"
AND "eigenvalue 3 too large"
AND "eigenvalue 2 too small"
AND "eigenvector 3 lies close to the z axis")
THEN "too little resolution in z"

The next inference chain might be:

IF "too little resolution in z" AND "water lens"
THEN "ascertain whether you are using water with an oil lens"

The simplicity of this example is meant only to elucidate the process itself. In the actual reduction to practice, much larger inference chains will result, which would go well beyond the scope of the present description to elucidate.

It remains to be said that newer modifications of the core inference concept, such as fuzzy rules, neuro-fuzzy rules, Bayes networks, etc., do not alter the principle in the least, but generate soft and continuous statements from the rules rather than the hard decision limits that result from Boolean logic. In these approaches, the traditional logic elements AND, OR, NOT, IF, and THEN are explicitly or implicitly replaced by softer equivalents. In the case of approaches based on probability theory, a probability is assigned to the rules by the control system in the Bayes approach, in which case the rules are selected for maximum probability. This is well understood by the specialist, and can be advantageous in an implementation, without contradicting the doctrine of this invention.

It must furthermore be remarked that various instruments may be generated from the same principle by the choice of features and rule base. One method for measuring the beam coupling of a laser in a scanning microscope is, for example, by taking a bead and analyzing the data by means of the above matrix-fit procedure. The eigenvector close to the z-axis or the angle of this vector to the z-axis could be displayed, or the inference engine could be used to assign tolerance classifications such as "good," "middling," or "poor." Such a system would more likely be found in production or among service technicians. The above example could, however, with another rule base give the user operating instructions, tips, tricks, and help. As is immediately obvious, the generation of tolerance classifications is only a special set of rules.

In general, the data generated by an inference run will be outputted, although the database will only give out a predetermined amount of data because internal, detailed intermediate results are of little interest to the user. If needed, a software filter that can be configured by the user could be adapted to give explanations of varying detail. The selection of output rules depends, in the end analysis, on the tastes of the system designer and not least the purpose to which the system is put, because a service technician can probably deal with internal inferences better than the untrained user, who is generally not interested in them. There is also a degree of freedom in the choice of output, so that aside from screen output, client systems could also have speech output.

Figure 3:
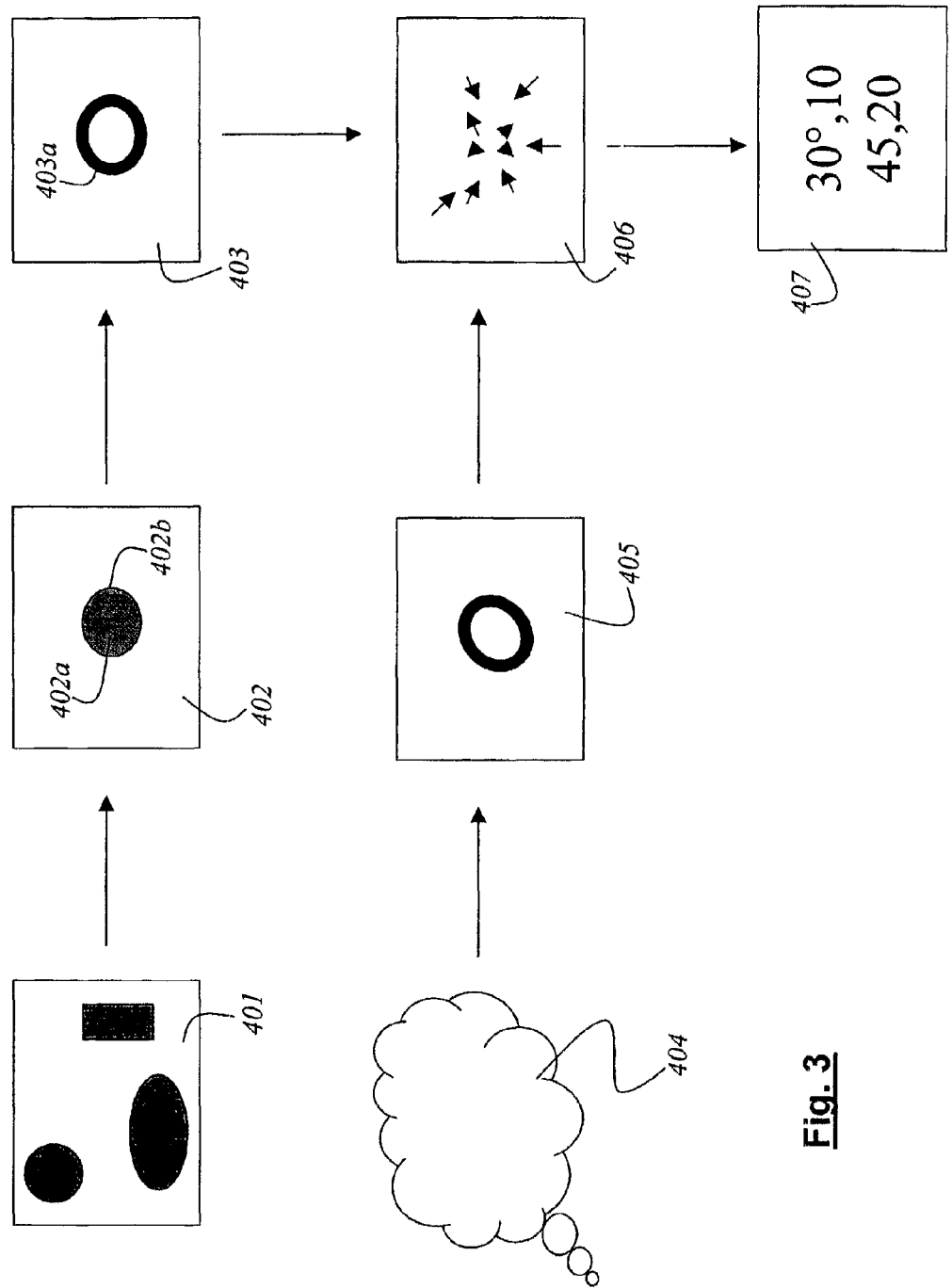
FIG. 3 a schematic representation of the method with a visualization of the effect on image data.

FIG. 3 exemplifies the method. One of the images (401, image (also volume)) is transformed by spectral modeling into a Fourier transform (402, Fourier-transformed image) or a similar related spectral model. One can easily recognize the band border in the Fourier transform, here characterized by a round structure (402*a*, round structure) at the center of the image. The border (402*b*, edge) of this structure (402*a*), which represents the limits of information loss, is interesting. As a result of processing, the difference between information gain and information loss is lessened in the Fourier image (402), so that the result (403, segmented resolution limits in the Fourier space of the image) traces this border (403*a*, border). Parallel to this, the theory (404, theory (gray)) yields a similar border situation if one submits the OTF to the same process (not depicted here). The processed OTF (405, segmented resolution limits in the Fourier space of the theory, predicted) exhibits a similar border structure (405*a*, edge structure), but it is not identical in the case of error. The comparator (304) adapts these new structures to each other by algorithmically calculating and characterizing a displacement vector field (406, displacement vector field in the comparator). In practice, because this is an internal function that requires a great deal of computational power, one selects a simple mathematical model with only a few degrees of freedom for the displacement field, which is recorded as parameters (407, parameters). These are then relayed for analysis, or displayed directly.

Figure 4:
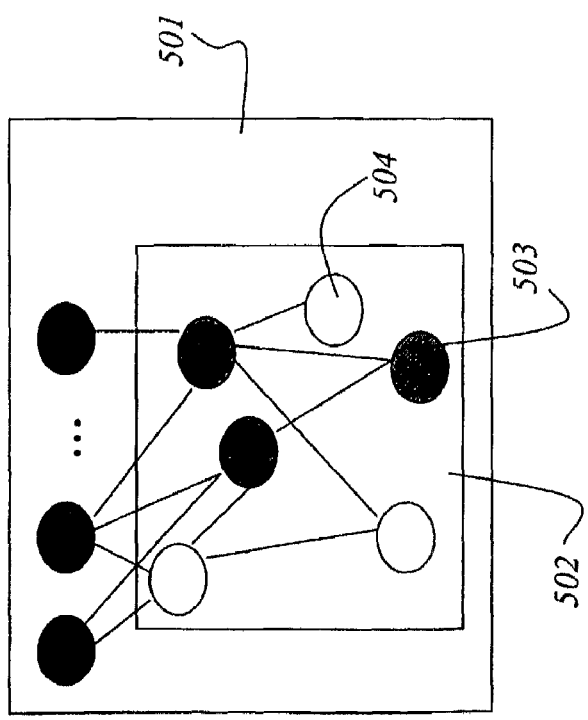
FIG. 4 explains the principle of the inference.

FIG. 4 illustrates the subsequent inference. From the set of all rules and factors (501, set of all rules and data), individual rules (502, set of all rules) are selected iteratively, and their premises are tested. As a result of this iterative process, a rule tree with fulfilled premises (503, set of all rules with met premises (that are therefore factual)) is generated during the run, which can be interpreted as an argument or evidence. The process continues until no further rules are generated. The set of all rules with unmet premises is shown as 504.

Figure 5:
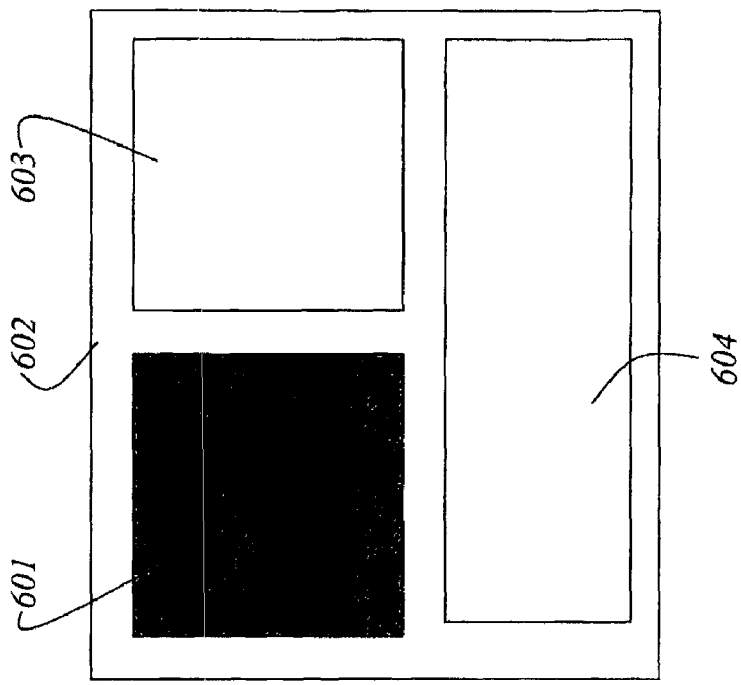
FIG. 5 a schematic representation of a user interface through which the user receives feedback to his microscope settings or measurements.

FIG. 5 exemplifies a possible user interface (602, user interface). It contains an imaging device (601, imaging device) as well as all necessary control elements for running the system (603, control elements (buttons, sliders, etc.)). It will be clear to the specialist that these elements are dependent on the chosen implementation and will look different in a confocal microscope that can be spectrally set than in a standard microscope. In addition, the user interface also contains an explanatory component (604, explanatory components with text display), in which the derived user data is presented in text form. Naturally, different languages are possible.

The invention has been described in terms of a particular embodiment. However, it is clear that changes and variations can be implemented without abandoning the scope of the following claims.

The invention claimed is:

1. A method for adjusting a scanning microscope comprising the following steps:
   transmitting a selected optical configuration of the microscope to a controlling computer;
   taking an image of a sample with the scanning microscope;
   calculating a Fourier transform of the image;
   determining an optical transfer function for the selected optical configuration;
   comparing resolution limits of the Fourier transform of the image with resolution limits of the optical transfer function for the selected optical configuration; and
   analyzing and displaying the results of the comparison.

2. The method according to claim 1, wherein the optical configuration comprises at least one of: a numerical aperture of a lens, a lens enlargement, a refraction index of an immersion medium, an intermediate microscope lens enlargement, a form of an aperture, a wavelength of lighting, a wavelength of a detection beam, a number of scan spots along a spatial axis or a spectral axis.

3. The method according to claim 1, wherein the comparison of the resolution limits of the Fourier transform of the image with the resolution limits of the optical transfer function for the selected optical configuration produces complex vectorial results.

4. The method according to claim 3, wherein the complex vectorial results are analyzed and displayed.

5. The method according to claim 3, wherein the analyzing of the complex vectorial results comprises choosing by inference rules a user feedback from a database.

6. The method according to claim 1, further comprising determining the resolution limits of the Fourier transform of the image and the optical transfer function by a mathematical transformation that maximizes the minima in the Fourier transform of the image and the optical transfer function, wherein the non-minimal values are suppressed.

7. The method according to claim 1, wherein the comparison of the resolution limits of the Fourier transform of the image and the optical transfer function comprises fitting a geometric transformation to the Fourier transform of the image and the optical transfer function to produce complex vectorial results.

8. The method according to claim 1, wherein the image is 3-dimensional.

9. The method according to claim 1, wherein the optical transfer function is determined from a database.

10. The method according to claim 1, wherein the optical transfer function is determined from the selected optical configuration.

11. A computer-readable medium comprising computer-executable instructions implementing a method comprising the following steps:
    transmitting a selected optical configuration to a controlling computer;
    taking an image of an object with a scanning microscope;
    calculating a Fourier transform of the image;
    determining an optical transfer function for the selected optical configuration;
    comparing resolution limits of the Fourier transform of the image with resolution limits of the optical transfer function for the selected optical configuration; and
    analyzing and displaying the results of the comparison.

12. The computer-readable medium according to claim 11, wherein the optical configuration comprises at least one of: a numerical aperture of a lens, a lens enlargement, a refraction index of an immersion medium, an intermediate microscope lens enlargement, a form of an aperture, a wavelength of lighting, a wavelength of a detection beam, a number of scan spots along a spatial axis or a spectral axis.

13. The computer-readable medium according to claim 11, wherein the comparison of the resolution limits of the Fourier transform of the image with the resolution limits of the optical transfer function for the selected optical configuration produces complex vectorial results.

14. The computer-readable medium according to claim 13, wherein the complex vectorial results are analyzed and displayed.

15. The computer-readable medium according to claim 13, wherein the analyzing of the complex vectorial results comprises choosing by inference from a database an explanation and displaying the explanation.

16. The computer-readable medium according to claim 11, further comprising determining the resolution limits of the Fourier transform of the image and the optical transfer function by a mathematical transformation that maximizes the minima in the Fourier transform of the image and the optical transfer function, wherein the non-minimal values are suppressed.

17. The computer-readable medium according to claim 11, wherein the comparison of the resolution limits of the Fourier transform of the image and the optical transfer function comprises fitting a geometric transformation to the Fourier transform of the image and the optical transfer function to produce complex vectorial results.

18. The computer-readable medium according to claim 11, wherein the image is 3-dimensional.

19. The computer-readable medium according to claim 11, wherein the optical transfer function is determined from a database.

20. The computer-readable medium according to claim 11, wherein the optical transfer function is determined from the selected optical configuration.

* * * * *